US005114295A

United States Patent [19]

Jansson

[11] Patent Number: 5,114,295

[45] Date of Patent: May 19, 1992

[54] CONTAINER HANDLING WAGON

[75] Inventor: Hadar Jansson, Helsingborg, Sweden

[73] Assignee: Sea Flats Aktiebolag, Helsingborg, Sweden

[21] Appl. No.: 491,701

[22] Filed: Mar. 12, 1990

[30] Foreign Application Priority Data

Mar. 13, 1989 [SE] Sweden ............................... 8900871

[51] Int. Cl.[5] ................................................ B60P 1/02

[52] U.S. Cl. .................................. 414/460; 294/81.4; 212/220

[58] Field of Search ............... 414/458, 459, 460, 461, 414/495, 626, 607; 294/81.4; 212/220, 221, 213

[56] References Cited

U.S. PATENT DOCUMENTS

| | | | |
|---|---|---|---|
| 3,513,999 | 5/1970 | Schwartz et al. | 414/460 |
| 3,558,172 | 1/1971 | Lamere et al. | 414/459 X |
| 3,966,069 | 6/1976 | Fathauer | 294/81.4 X |
| 3,982,644 | 9/1976 | Pease | 414/460 |
| 4,093,090 | 6/1978 | Whiteman | 294/81.4 X |
| 4,181,462 | 1/1980 | Holmes | 414/460 |
| 4,657,150 | 4/1987 | Glickman et al. | 212/220 X |
| 4,749,328 | 6/1988 | Lanigan, Jr. et al. | 414/460 X |

FOREIGN PATENT DOCUMENTS

| | | | |
|---|---|---|---|
| 8201690 | 5/1982 | PCT Int'l Appl. | 414/460 |

*Primary Examiner*—Frank E. Werner
*Attorney, Agent, or Firm*—Larson and Taylor

[57] ABSTRACT

A container handling wagon of the straddle wagon type having twist locks (10) for engaging corresponding bores of corner boxes of a container for collecting and depositing the container, and in which the twist locks (10) are mounted in, or in direct connection to, a connection frame (10) or a yoke (28), and in which the twist locks (19) are mounted in a slide beam (13) or a similar device, which is displacable in the transversal or the longitudinal direction of the container handling wagon, and wherein the twist locks (19) are mounted displaceable in the said slide beam (13) in a direction perpendicularly to the first mentioned direction, whereby the connection frame (10) or the yoke (28) can be displaced laterally and/or rotated in relation to the longitudinal direction of the container handling wagon, thereby locating the twist locks (19) in exact positions in relation to a container which is correspondingly rotated or displaced laterally in relation to the container handling wagon.

10 Claims, 4 Drawing Sheets

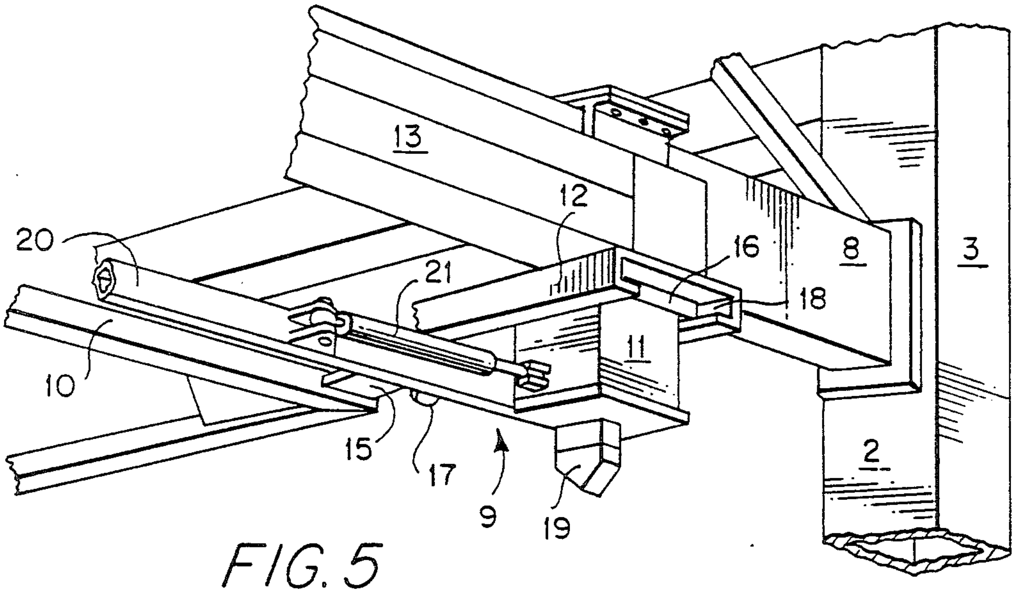
F/G. 5
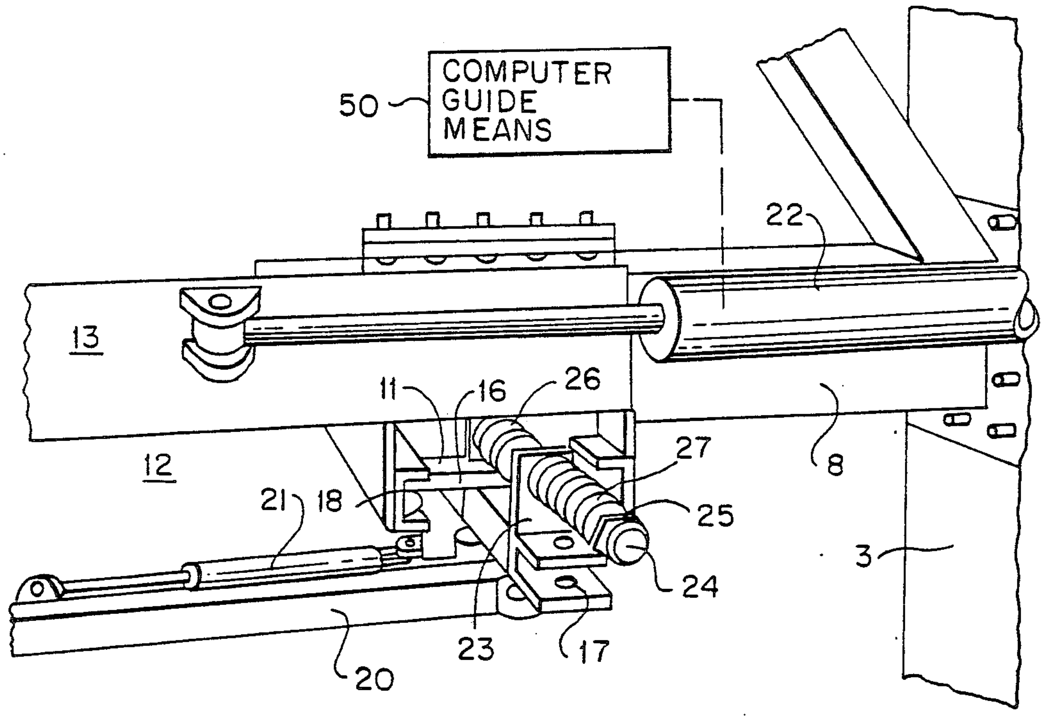
F/G. 6

CONTAINER HANDLING WAGON

The present invention generally relates to an apparatus for handling containers which, at the upper corners thereof, are formed with corner boxes, in which rotatable locking means, so called twist locks, are adapted to be introduced and be locked for making it possible to lift the container.

More particularly the invention relates to such a container handling wagon which is in the form of a straddle wagon or truck which is formed with a yoke or a connection frame having twist locks which, with respect to their mutual longitudinal and lateral distances exactly coincide with those of the corner boxes of the container, and which wagon is intended to be driven to a position over a container with the legs of the wagon straddling over the container, whereupon the yoke or the connection frame is lowered, the twist locks are guided into the corner boxes and are locked therein, and the container is lifted and is moved off.

In practice it is very difficult to move or drive the straddle truck into such an exact position over the container wagon that the twist locks can be brought exactly into the corner boxes of the container. Conventionally it has therefore been necessary to design the straddle truck so that the yoke or the connection frame can be displaced laterally, can be rotated, or can be displaced both longitudinally and laterally for having the twist locks fit into the corner boxes.

The French patent 2,018,423 discloses an apparatus for solving the above mentioned problem, in which apparatus the container handling wagon is split into two longitudinally separated handling units having fixed twist locks, and in which said twist locks are, in pairs, guided to fit into two of the corner boxes of the container. This is done so that each of the two separate container wagon parts are "coaxed" into the exactly correct positions by being moved on their steerable wheels.

The German patent 1,556,279 discloses an apparatus in which the container handling wagon has a separate connection frame which can be moved in two directions perpendicularly to each other and in relation to the straddle wagon, namely in a direction straight longitudinally and a direction straight transversally of the straddle wagon whereby the twist locks can be brought to fit the corner boxes of a container standing slightly offset the straddle wagon.

Other known structures are formed with frames or yokes which are loosely hanging in chains, wires etc. and which are formed with twist locks which are fixed in the frame or yoke.

All of said known apparatus are disadvantageous in that they are complicated to handle; or in that it is difficult and time consuming to bring the twist locks to fit the corner boxes of the container; or in that it is not possible, with a still standing container handling wagon and by operating only the yokes or connection frames, to connect the twist locks to a container which is standing slightly rotated (even if only a couple of degrees) in relation to the container handling wagon; or in that they give an imperfect precision both when connecting and collecting a container and when depositing a container; or in that the container is hanging loosely in the chains or the wires of the container handling wagon, and there is a risk of damage in case the container should start swinging.

The object of the invention is to solve the above mentioned problem and to provide a container handling wagon of the straddle wagon type which is formed with means comprising twist locks for collecting and delivering a container, which wagon has steadily connected twist locks, which is formed with a yoke or a connection frame which keeps the twist locks in exactly predetermined positions, and which is arranged so that the twist locks can be displaced to different positions thereby adapting the position of the twist locks to a container which is standing obliquely, rotated or laterally displaced in relation to the container handling wagon.

Further characteristics of the invention will be evident from the following detailed specification in which reference will be made to the accompanying drawings.

In the Drawings

FIG. 1 is a perspective view of a container handling wagon formed with a twist lock arrangement according to the invention.

FIGS. 2, 3 and 4 diagrammatically show the function of the apparatus according to the invention.

FIG. 5 shows a detail of the apparatus of FIG. 1 in a perspective view from underneath, and FIG. 6 shows the same detail seen in a top perspective view from the opposite side than that of FIG. 5 and with the connection frame removed for the sake of clarity.

Figure 1:
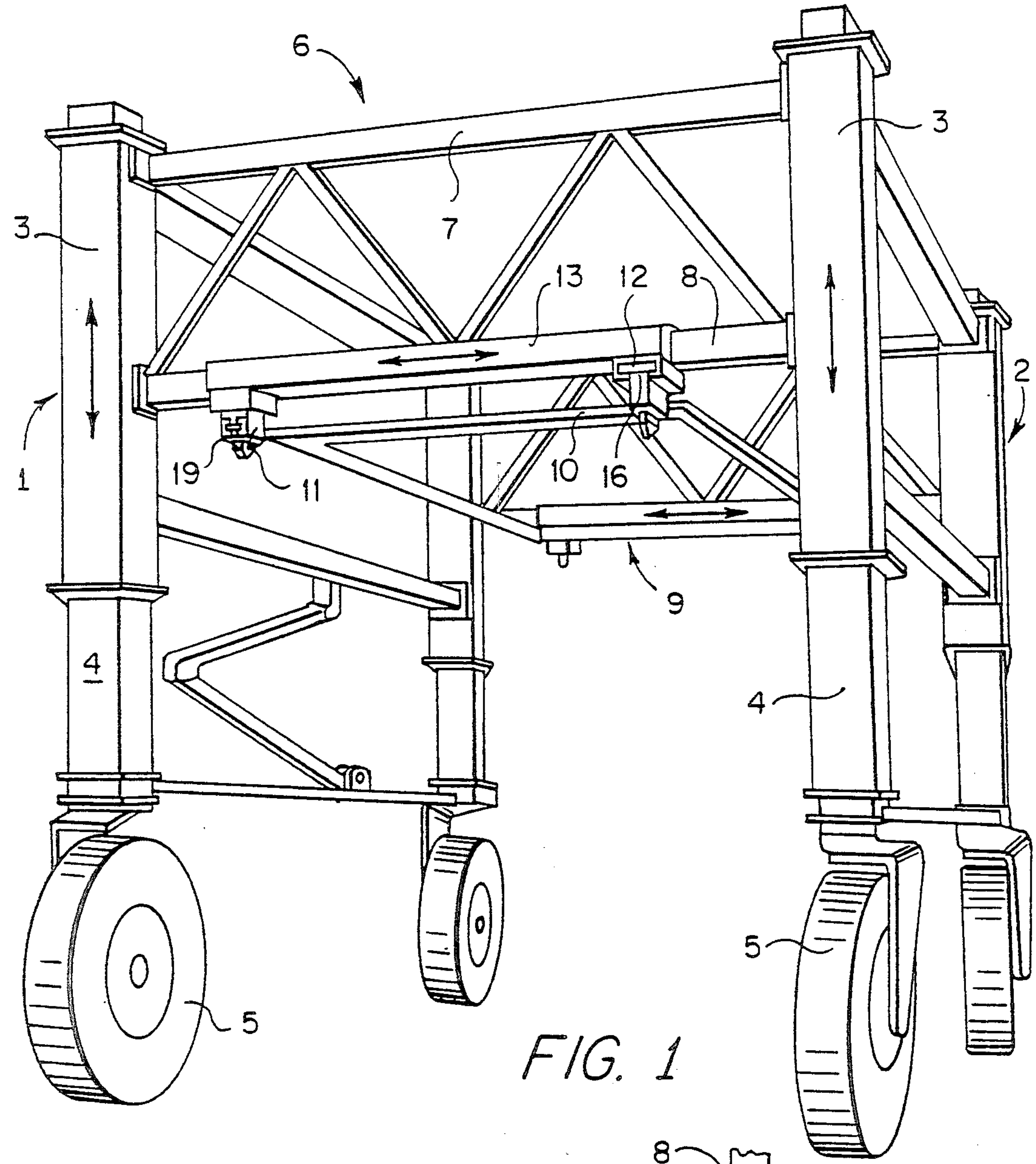

The basic structure of the container handling wagon of FIG. 1 is of known type, and it comprises two frame sides 1 and 2 having outer telescopic tubes 3 each of which can be raised and lowered telescopically on a telescopic leg 4. The telescopic legs 4 support the container wagon on the ground by means of drive wheels 5. The frame sides 1 and 2 are interconnected at the upper ends of the telescopic tubes 3 by means of a transversal framework 6 having upper and lower supporting horizontal cross beams 7 and 8. The frame sides 1 and 2 provide, in combination with the frameworks 6 a straddle wagon which can be driven to a position straight over a container (not shown) for collecting, transporting and delivering said container.

To this end the lower cross beam 8 carries a twist lock system 9, which in the illustrated case comprises a connection frame 10 which via twist lock houses 11 and slide houses 12 is connected to a slide beam 13. Each twist lock house 11 is slidable in a slide house 12 in the longitudinal direction of the container wagon, and the slide beam 13 is slidable laterally of the container wagon on the lower cross beam 8. At or adjacent each corner the connection frame 10 is formed with a projecting arm 15 (see FIG. 4) which over a cross pin 17 is rotatable in relation to the twist lock house 11, so that the connection frame can be rotated in relation to the twist lock house 11 in connection to a side displacement of the slide beam 13 at each end of the container wagon on the two (front and rear) cross beams 8. The slide beams 13 can be displaced on the cross beams 8 in the lateral direction of the container wagon independently of each other and in the same or different directions, so that the connection frame 10 can be laterally displaced in the container wagon or can be rotated in one direction or the other about an imaginary vertical center axis.

Figure 7:
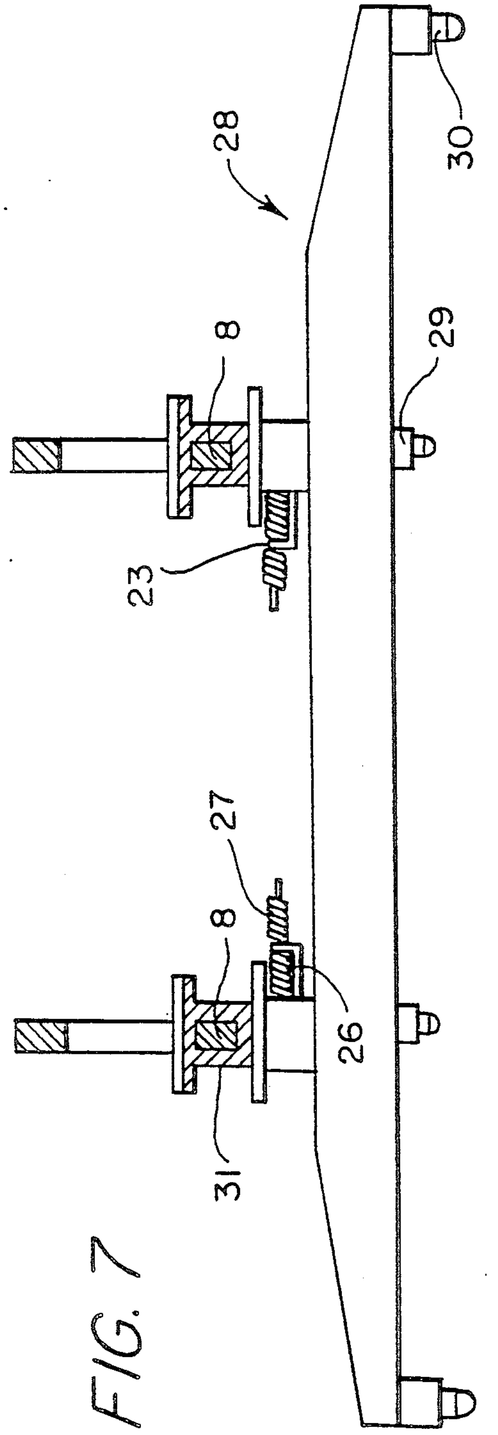
FIG. 7 is a side view of a yoke for use in the container handling wagon of FIG. 1.
Figure 8:
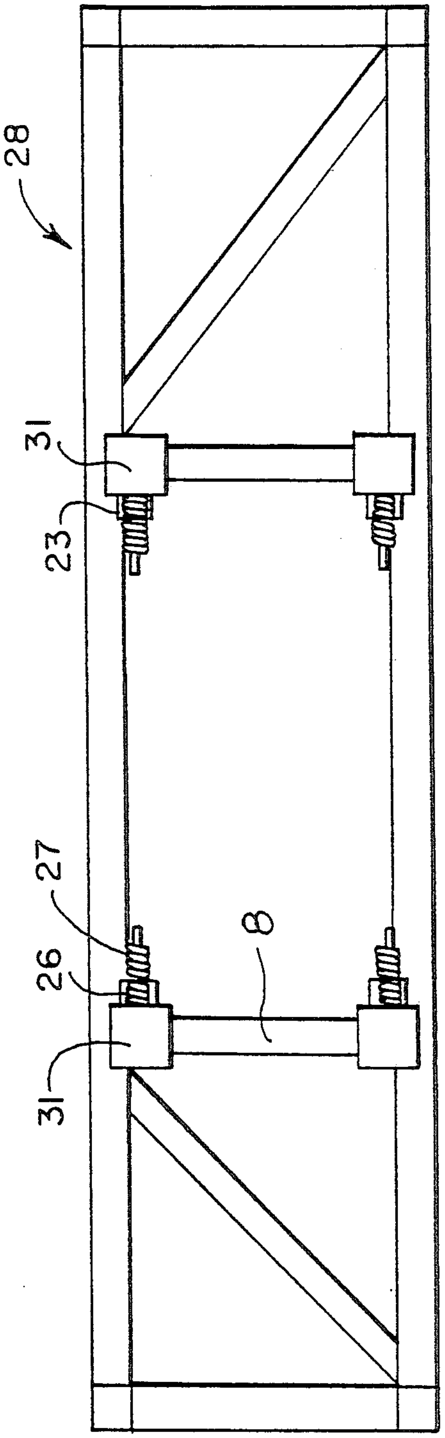
FIG. 8 is a top view of the yoke of FIG. 7.

Instead of using a connection frame having twist lock houses slidably connected thereto the container wagon can be formed with a yoke as shown in FIGS. 7 and 8. In such case twist locks are fixedly connected to the yoke, and the unit of yoke with twist locks is laterally displacable and also rotatable exactly like the connection frame 10 of the above described apparatus. The apparatus comprising the yoke is illustrated and will be described more in detail in connection to the description of FIGS. 7 and 8.

Figure 4:
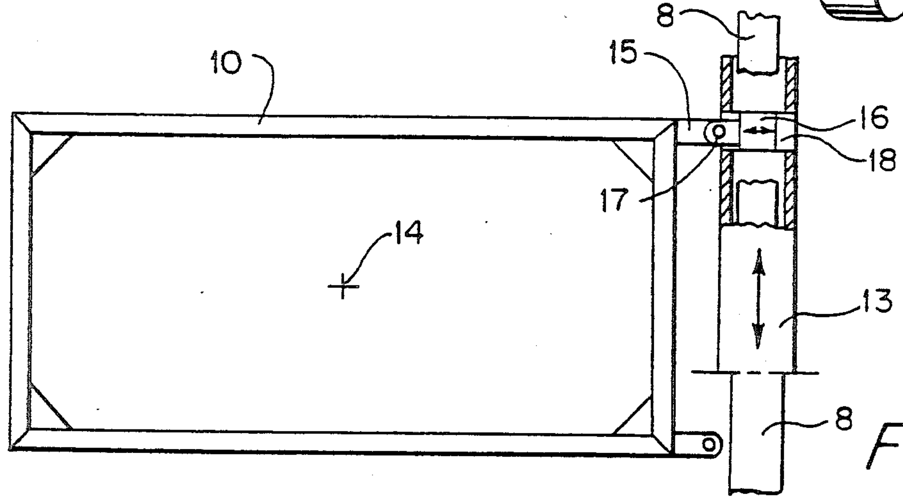
Figure 2:
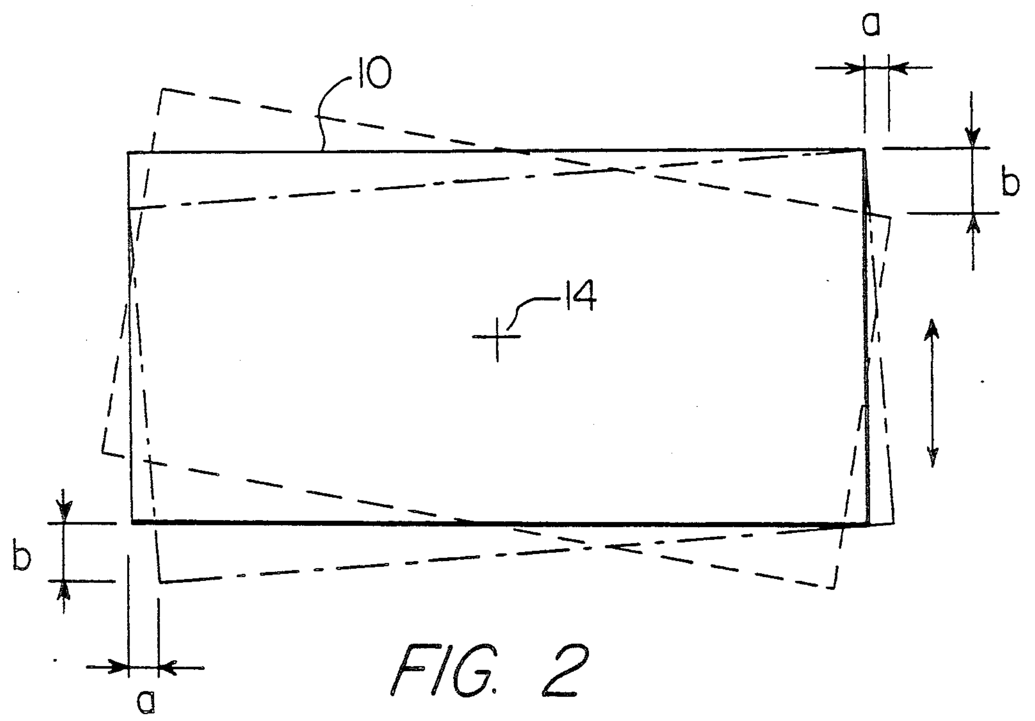
Figure 3:
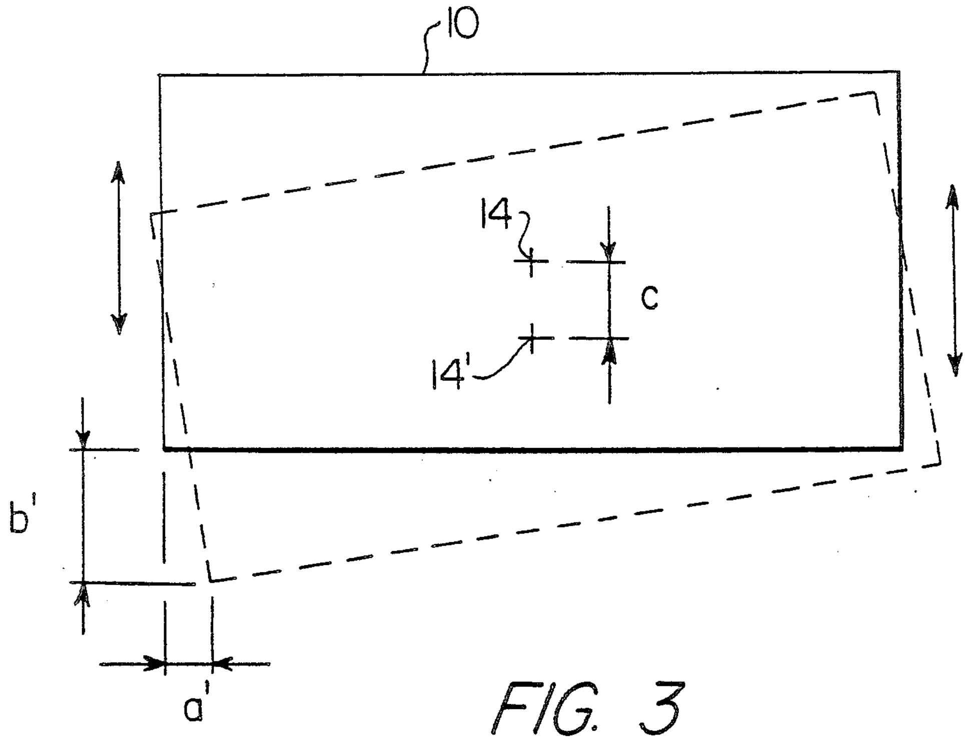

The lateral displacement and the rotation of the connection frame 10 with the twist locks is diagrammatically illustrated in FIGS. 2, 3 and 4. In FIG. 2 the full lines show the connection frame 10 in its neutral position with full lines. The broken lines illustrate how the connection frame 10 has been rotated in the clockwise direction, and this is made by displacing the "right" slide beam "downwardly" as shown in the drawing, whereas the "left" slide beam is being displaced a corresponding distance "upwards" as shown in the drawing, whereby the connection frame is rotated about its vertical centre point 14.

By the broken-dotted lines of FIG. 2 is shown how the displacement is started from a fixed point, namely from the upper right corner, and how the connection frame has been rotated similarly but in the counterclockwise direction by displacing only the "left" slide beam "downwardly".

It is obvious that each corner of the connection frame, upon a displacement according to the broken lines of FIG. 2, is moving a distance "a" in the longitudinal direction of the wagon and a distance "b" in the transversal direction of the wagon. The twist locks are displaced similarly in the case illustrated with the broken-dotted lines in FIG. 2, like the twist locks in the case of FIG. 3, in which the twist locks are displaced the distanced a' and b' respectively.

By such displacement and/or rotation of the connection frame 10 with the twist locks, and eventually also by driving the wagon a slight distance forwardly or rearwardly it is consequently possible to set the twist locks in exactly desired positions above the corner boxes of the container—even if the container is standing laterally offset or rotated in relation to the longitudinal center line of the container wagon, and even both laterally displaced and rotated.

FIG. 3 illustrates the case where both the "left" and the "right" slide beams are first moved "downwardly" a distance corresponding to a displacement of the center point 14 a distance "c" to the point 14', whereupon the "left" slide beam is moved a further distance "downwards", whereby the connection frame becomes both laterally displaced and rotated corresponding to a longitudinal displacement a' and a transversal displacement b' at the lower left corner.

FIG. 4 diagrammatically shows that the connection frame 10 is formed with arms 15 projecting in the longitudinal direction of the container wagon. For the sake of clarity only the "upper right" arm 15 is shown. Each arm 15 is rotatably connected to a slide bar 16 of the twist lock house 11 over a vertical pin 17 about which the arm 15 and the twist lock house 11 can be rotated in the horizontal plane. The bar 16 is reciprocally slidable in a guide 18 of the slide house 12 at both ends of the container wagon. Each slide house 12 is fixedly connected to the slide beam 13, which is, in turn, slidable transversely in opposite directions on the lower cross beam 8 of the framework 6 at both ends of the container wagon.

It is obvious to the expert that the invention allows many different adjustments for having the twist locks fit into the corner boxes of a container which may be standing in many different positions in relation to the container handling wagon.

As best evident from FIG. 5 the twist lock house 11 projects downwardly under the guide 18 of the slide house, and that the twist lock house 11 comprises a downwardly extending twist pin 19 of a type known per se. When lockingly collecting the container the twist pin 19 is adapted to enter a matching bore of the corner box of the container, and to lockingly connect the entire apparatus by rotating the pin 19, for instance over 90°. The twist pin 19 is actuated for rotation by a (not shown) arm which is connected to an actuation link 20 which is in common for two co-operating twist pins. The link 20 can be moved in a locking and a releasing direction respectively by means of a hydraulic cylinder 21, and this is made independently of the mutual positions between the cross beam 8 and the slide beam 13 and between the twist lock house 11 and the slide house 12 respectively.

FIG. 6 shows that the slide beam 13 is displacable by the actuation of a hydraulic cylinder 22 which is connected between the slide beam 13 and the telescopic tube 3 of one of the frame sides 1 or 2. FIG. 6 also shows that the apparatus is formed with a means for balancing the twist lock house 11 in relation to the slide house 12. To this end a part of the slide bar 16 extending towards the connection frame 10 is formed with projecting spring stop plate 23. A bolt 24 which is connected to the slide 13 extends freely movable through said spring stop plate 23. The free end of the bolt 24 carries a nut 25. A first balancing spring 26 is clamped between the slide beam 13 and the spring stop plate 23, and a second balancing spring 27 is clamped between the spring stop plate 23 and the bolt nut 25. The balancing means is arranged so that the twist lock house 11 tends, when the connection frame is in its central position, to take a position which in the longitudinal direction of the container wagon is centrally in the slide house 12. Therefore, when the connection frame is no longer rotated the balancing means automatically, and by the actuation of the springs 26 and 27, places the connection frame in a neutral position.

When a container is to be collected the container handling wagon is moved to a position over the container so that at least one of the twist lock pins 19 is in position exactly above or at least close to a corner box of the container to be collected. By the actuation of the hydraulic cylinder 22 for the slide beam 13 on one side or on both sides of the wagon the connection frame 10 is rotated so that all four twist lock pins 19 come into position above the four respective corner boxes of the container. Then the entire twist lock system is lowered in that the telescopic tubes 3 are lowered on the telescopic legs 4, whereby the twist lock pins 19 slide into the bores of the respective corner boxes. By the actuation of the links 20 via the hydraulic cylinders 21 the twist lock pins 10 are rotated thereby taking their locking positions, and the container becomes hooked by the twist lock system. The container can be lifted by raising the hydraulic tubes 3 on the hydraulic legs 4 and it can be transported by the container handling wagon to the place where the container is to be deposited. The connection frame is preferably reset to its neutral position before the container is transported and this is made by displacement of the slide beams 13 by the actuation of the hydraulic cylinders 22.

In the case of handling very heavy containers it can be difficult to find springs 26 and 27 which are strong enough for placing the twist lock houses in their neutral positions, and in such case each pair of springs 26, 27 can be substituted by a hydraulic cylinder having a means for exactly marking the expel position, for instance a potentiometer guide means, and a similar means can be arranged on the cylinders 22 for the slide beams 13. A computer guide means 50 of a type known per se is provided for combining the expelling of the two slide beam cylinders 22 and the four twist lock housing cylinders, so that said last mentioned cylinders automatically and accurately set the twist locks corresponding to the displacement of the slide beam cylinders, and vice versa.

Instead of using the above described system with the connection frame and the slidable twist lock housings it is possible to substitute said means by a yoke 28 of the type shown in FIGS. 7 and 8. In this case the yoke is preferably formed with two sets of twist locks for making it possible to alternatively handle large size containers and small size containers. The yoke may have a first inner set of twist locks 29 for handling of so called 20-foot containers and an outer set of twist locks 30 for handling of so called 40-foot containers. The inner set of twist locks 29 is mounted on a slightly higher level than the outer set of twist locks 30 in order not to interfere with the handling of the large size containers. The yoke is formed with four slide houses 31 which slide on the lower cross beam 8, and the yoke is displaced transversally as with the previously described slide beams. Also in this case the twist lock house is displacable in a slide house and it is also, like in the previously described embodiment, formed with a spring stop plate 23 and two balancing springs 26, 27, or with the above described system comprising six co-operating hydraulic cylinders (not shown).

As previously mentioned it is possible to form the apparatus with a fixed point of rotation, as marked with the broken-dotted lines in FIG. 2, which point of rotation can be displaced together with the slide beam, but about which any and all rotation of the connection frame or the yoke occurs. The three remaining twist locks are formed with twist lock houses which make said three twist locks displacable both in the longitudinal direction and in the transversal direction of the container handling wagon, as described above.

REFERENCE NUMERALS

1 frame side
2 frame side
3 telescopic tube
4 telescopic leg
5 drive wheels
6 framework
7 cross beam
8 cross beam
9 twist lock system
10 connection frame
11 twist lock house
12 slide house
13 slide beam
14 center axis
15 arm
16 slide bar
17 cross pin
18 guide
19 twist pin
20 actuation link
21 hydraulic cylinder
22 hydraulic cylinder
23 spring stop plate
24 bolt
25 nut
26 spring
27 spring
28 yoke
29 twist lock (inner set)
30 twist lock (outer set)

We claim:

1. A container handling wagon of the straddle type for handling a container, said wagon comprising:

a movable frame for straddling a container, including generally parallel horizontal lateral supports, means for allowing vertical displacing said lateral supports relative to a remainder of said frame, a respective slide bar slidably mounted on a respective said lateral support, for lateral movement thereon in a direction parallel to said supports, a respective hydraulic cylinder means, mounted to a respective said support and connected to a respective said slide bar, for displacing said slide bars, a respective pair of slide plate guides mounted to an underside of a respective said slide bar, and a respective slide plate adapted to be displaceably received by each respective said slide plate guide, a respective twist lock housing mounted to respective said slide plates, rigid connection means mounted to said housings for interconnecting associated said housings and thereby being together with said housings laterally displaceable in directions parallel and perpendicular to said support means and further rotatable with respect to said support means, twist lock means for locking into lock receiving bores on the container to be handled, said twist lock means fixedly mounted to said housings, said twist lock means thereby being laterally displaceable in tandem with said connection means, the combination of vertical displacement of said supports along with lateral and rotational displacement of said twist locks thus allowing said twist locks to be easily aligned with the lock receiving bores of the container to be handled for locking therein to thereby secure the container to the frame.

2. The container handling wagon of claim 1, wherein said rigid connection means comprises a connection frame, said connection frame being laterally pivotably connected to each of said housings.

3. The container handling wagon of claim 2, wherein said connection frame is substantially rectangular, and said connection frame is connected, at each of its corners, to said housings.

4. The container handling wagon of claim 2, wherein one of said corners of said connection frame is fixed to said frame such that the fixed corner can not move laterally, said frame being free to rotate about said fixed corner.

5. The container handling wagon of claim 1, wherein said wagon comprises two of said lateral supports, one of said slide bars being provided on each lateral support, one of said housing being provided on each said side plate, and one of said twist lock means being provided on each of said housing, such that a total of four of said twist lock means are provided.

6. The container handling wagon of claim 1, and further including a respective spring means for biasing a respective said slide plate within an associated said plate guide such that said slide plate, said housings, said connection means, and said twist locks are biased towards central balanced positions, each said spring means comprising pairs of springs mounted to said slide bars parallel to the plate guide and connected to opposing sides of said slide plates such that said springs provide a biasing force tending to center said slide plate within said plate guide.

7. The container handling wagon of claim 1, wherein said slide plates are displaceable by respective hydraulic cylinders mounted on said slide bars and connected to said slide plates.

8. The container handling wagon of claim 7, wherein the displacement of said slide bars and said slide plates by said hydraulic cylinders is actuated by a computer means for maintaining relative mutual distances between said twist locks.

9. The container handling wagon of claim 1, wherein said wagon comprises two of said lateral supports, one of said slide bars being provided on each lateral support, said housings and said rigid connecting means together comprising an integral yoke.

10. The container handling wagon of claim 9, with two sets of four twist locks means being connected to and depending from said yoke, said two sets comprising an inner set, adapted to lock into the lock receiving means of a small size standard container, and an outer set, adapted to lock into the lock receiving means of a large size standard container, with said inner set being mounted on said yoke at a higher level than said outer set so as to terminate before any interference with said outer set when said outer set is in use.

* * * * *